3,632,666
POLYETHER-POLYAMIDE BLOCK COPOLYMERS CONTAINING POLYAMIDE, POLYESTER OR POLYAMIDE-POLYESTER OR POLYAMIDE-POLYESTER BLOCK COPOLYMERIC SYNTHETIC RESINS AND IONIC COMPOUNDS
Kaoru Okazaki, Yoichi Shimokawa, Asaharu Nakagawa, and Kenji Sugii, Nagoya, Japan, assignors to Toray Industries, Inc., Tokyo, Japan
No Drawing. Continuation-in-part of application Ser. No. 679,169, Oct. 30, 1967. This application Mar. 6, 1970, Ser. No. 17,299
Int. Cl. C08g 41/04
U.S. Cl. 260—857                    3 Claims

ABSTRACT OF THE DISCLOSURE

Frictionally chargeable property of a synthetic resin composition consisting of a polyether-polyamide block copolymer blended with ether synthetic resins is remarkably improved by coexistence of ionic functional groups in very small amounts which is achieved by addition of an organic electrolyte. This synthetic resin composition is used for the preparation of fiber, film and shaped articles, and it is especially useful as one component of a composite fiber.

---

This application is a continuation-in-part of U.S. application Ser. No. 679,169, filed Oct. 30, 1967, now U.S. Pat. 3,514,498.

The present invention relates to a polyether-polyamide block copolymer-containing synthetic resin composition whose antistatic property is remarkably improved by the addition of an organic compound having an ionic functional group and shaped articles of said composition.

Various antistatic methods of synthetic resin compositions have been heretofore proposed. We also proposed an antistatic method for polyamide resins which comprises incorporating in a polyamide resin a so-called polyether-polyamide block copolymer in which the polyether component and the polyamide component form a linear high-molecular chain in the form of blocks. This method has an advantage that since the polyether component which has an antistatic effect has been chemically bonded to the polyamide component, the polyether component does not come off in such operations as washing and dyeing, and hence, a permanent antistatic effect can be attained. However, in this method, in case an attainment of a higher antistatic effect is intended, it is necessary to increase the content of the polyether component in the composition. If too much polyether component is incorporated, the mechanical properties of the resulting composition are inevitably lowered. Particularly, in the case where fibers are prepared from the above composition, the lowering in the mechanical properties is a fatal defect. In this regard, a limitation should be naturally given to the content of the polyether component present in the synthetic resin composition, and it is not permissible to increase the content of the polyether component beyond such limitation. Accordingly, there is a certain limitation to the highness of the antistatic effect attained in this method, and this method has a defect that it fails to meet sufficiently the request for resin products having a high antistatic effect over said limitation.

An object of this invention is to provide antistatic synthetic resin compositions free of the above mentioned defect. Another object of this invention is to provide antistatic synthetic resin compositions from which there can be prepared fibers having excellent fibrous properties over those prepared from conventional antistatic synthetic resin compositions, as well as excellent antistatic property.

The present invention provides an antistatic synthetic resin composition comprising a polyetherpolyamide block copolymer as at least one resin component of said composition and an organic compound having at least one kind of ionic group, the polyether content of said block copolymer based upon the total resin composition being 0.1–20% by weight, the ionic group being present in an amount of from about $2.0 \times 10^{-6}$ to $1.0 \times 10^{-4}$ mol/g. based upon the total resin composition.

The synthetic resin composition of this invention can be prepared by incorporating an organic compound having at least one kind of an ionic group in a polyetherpolyamide block copolymer in which the polyamide has repeating carbonamide groups as an integral part of the polymeric chain, or in a mixture of said polyetherpolyamide block copolymer with at least one other melt-shapeable synthetic resin, in such an amount that the content of the ionic group is within a range of from $2.0 \times 10^{-6}$ to $1.0 \times 10^{-4}$ mol/g., with the proviso that the content of the polyether component in the total resin composition should be within a range of from 0.1 to 20% by weight.

The organic compound having at least one kind of an ionic group to be used in the present invention includes metal salts of organic compounds having at least one acidic group, and organic ammonium salts.

As the above acidic group there may be cited carboxyl group, sulfonic acid group and phosphoric acid group. Specific examples of the organic compound having at least one acidic group are sulfonic acids of higher aliphatic hydrocarbons or aromatic hydrocarbons; sulfuric or phosphoric acid esters of higher alcohols; and derivatives of the above compounds.

As to the kind of these metal salts, there is no particular limit, but salts of alkali metals and alkaline earth metals are suitable, above all potassium and sodium salts are most preferable.

As concrete examples of the metal salt, potassium, calcium and sodium stearates, sodium salt of a polycapramide oligomer, sodium p-stearyl-benzene sulfonate or sodium distearyl phosphate may be cited.

An organic ammonium salt as herein referred to is a quaternary ammonium salt as shown in the following formula, at least one of the substituents should be other than hydrogen, these substituents may be polyethylene oxide and derivatives thereof.

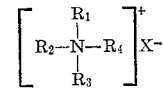

wherein $R_1$, $R_2$, $R_3$ and $R_4$ each are a member selected from the group consisting of hydrogen, alkyl of 1 to 2 carbon atoms, aryl, alkaryl and polyalkylene oxide groups.

A polyether-polyamide block copolymer as herein referred to is a block copolymer wherein polyamide such as polycapramide and polyhexamethylene adipamide and polyether such as polyethylene oxide are linked in the state of a straight chain and as a process for synthesizing the same, there are, for instance, the following processes. However, the present invention will not be limited by these synthesizing processes.

(a) A lactam is polymerized in the presence of an organic or inorganic acid salt of polyether having at its end at least one amino group to synthesize a block copolymer wherein polyamide is bonded to the end of polyether.

(b) Polyamide having at its both ends carboxyl (or amino) groups or an oligomer thereof and polyether having at its both ends amino (or carboxyl) groups or an oligomer thereof are condensed in molten states to prepare a block copolymer.

(c) Polyamide forming monomer is polycondensed in the presence of polyether having at its end at least a carboxyl group or an organic ammonium salt thereof.

Monomers for forming polyamide as herein referred to are, for example, cyclic lactams such as ε-caprolactam, η-capryllactam and ω-lauryllactam. ω-aminocarboxylic acids such as ε-aminocaproic acid and 11-aminoundecanoic acid, and salts of aliphatic or aromatic diamines with dicarboxylic acids such as hexamethylene diammonium adipate, hexamethylene diammonium sebacate and m-xylylene diammonium adipate, which are used solely or in admixture. It goes without saying that when a mixture is used, a polyamide component of the obtained polyether-polyamide block copolymer has become copolymerized polyamide.

Polyether as herein referred to is polyalkylene oxide such as polyethylene oxide, polypropylene oxide, polybutylene oxide and polytetramethylene oxide and copolymers thereof and may contain a small amount of another copolymerizable component. Of these, polyethylene oxide is the most suitable for the object of the present invention.

In these block copolymers, a catalyst used for the copolymerization, unreacted polyether and polyamide, and an additive such as a sunlight resisting agent and a heat resisting agent may exist.

As melt-shapeable synthetic resins in the present invention, polyamides, polyesters, polyester-polyamide block copolymers, polyolefins and polyvinyl may be cited.

Polyamide used in the present invention is either an ordinary polyamide obtained from lactam, ω-aminocarboxylic acid or a diamine and a dicarboxylic acid or a copolymerized polyamide, and, for instance, nylon 6, 66, 12 and 66/6 (66/6 stands for copolymerization) are included. In such polyamide, an ordinary polymerization catalyst need for the polymerization or an additive such as a heat resisting agent and a sunlight resisting agent may remain.

Polyester used in the present invention is an ordinary polyester or a copolymerized polyester obtained from a dicarboxylic acid or a derivative thereof and dioxy compound or alkylene oxide, and from an oxycarboxylic acid, and, for instance, polyethylene terephthalate and polyethylene isophthalate may be cited. In such polyester, an ordinary catalyst used for the polymerization or an additive such as a sunlight resisting agent and a heat resisting agent may remain.

A polyester-polyamide block copolymer as herein referred to is a block copolymer of a structure wherein said polyester component and polyamide component are linked in the state of a straight chain, and as a process for the synthesis, there are, for instance, the following processes.

(a) A process of polycondensing in solid phase polyamide having at its both ends amino (or carboxyl) groups and polyester having at its both ends carboxyl (or amino) groups to make them a polyester-polyamide block copolymer.

(b) A process of polycondensing in a solution polyamide having at its both ends amino (or carboxyl) groups and polyester having at its both ends carboxyl (or amino) groups to make them a polyester-polyamide block copolymer.

(c) A process of polycondensing a mixture of polyamide a majority of whose both ends is amino groups and polyester whose both ends consist predominantly of hydroxyl groups by heating in solid phase under a reduced pressure and distilling off diol.

And in such a polyester-polyamide block copolymer, a copolymerization catalyst used for the copolymerization, unreacted polyester and polyamide and an additive such as a sunlight resisting agent and a heat resisting agent may be included.

As polyolefin, polyethylene and polypropylene may be cited wherein the polymerization catalyst and an additive such as a sunlight resisting agent and a heat resisting agent may be included. As polyvinyls, polyvinyl chloride, polyvinyl alcohol, polyacrylonitrile, and polyvinyliden chloride may be cited.

The composition of this invention is prepared by incorporating an organic compound having at least one kind of an ionic group in a polyether-polyamide block copolymer or in a mixture of said block copolymer with other melt-shapeable synthetic resin, and in said composition, the ionic group is present in an amount of $2.0 \times 10^{-6} - 1.0 \times 10^{-4}$ mol/g., preferably $5.0 \times 10^{-6} - 5.0 \times 10^{-5}$ mol/g., based on the total composition.

When the amount exceeds $1.0 \times 10^{-4}$ mol/g., sometimes it results in adversely affecting the spinning of said composition on the contrary. Again, with an amount below $2.0 \times 10^{-6}$ mol/g., the expectable effect is not sufficient.

It is critical that the content of the polyether component of the polyether-polyamide block copolymer is 0.1–20% by weight based on the total resin composition. The preferable content of the polyether component is within a range of 0.1–10% by weight, especially 0.3–5% by weight. In case the content of the polyether component is below 0.1% by weight, a sufficiently high and durable antistatic effect cannot be obtained. In contrast, in case said content exceeds 20% by weight, the mechanical properties of articles prepared from such resin composition are much lowered. Therefore, in order for the composition of this invention to be excellent in both antistatic and mechanical properties, it is indispensable to limit the content of the polyether component within the above mentioned range of from 0.1 to 20% by weight based on the total composition.

As to the length of a polyether segment in a polyether-polyamide block copolymer used in the process of the present invention, there is no particular limit, however, the average number of alkylene oxide recurring units in each polyether segment of polyether-polyamide block copolymer is usually 20–180, preferably 45–130.

In the composition of this invention, better results are obtained when a mixture of the polyetherpolyamide block copolymer with other melt-shapeable synthetic resin is used as the polymer component, than when the polyether-polyamide block copolymer alone issued.

In the case of the mixture, in order to raise the antistatic effect, it is effective to blend a small amount of a polyether-polyamide block copolymer whose content of a polyether component is relatively large with the melt-shapeable synthetic resins. It is proper to use a polyether-polyamide block copolymer in which the content of a polyether component is within the range of 15–85% by weight, preferably 20–60% by weight.

As a process for mixing a polyether-polyamide block copolymer with synthetic resins such as polyamide, polyester, polyester-polyamide block copolymer and polyolefin, the following processes may be cited.

(i) A process of well mixing chips of the two polymers and feeding this mixed chips to an ordinary melt spinning or shaping machine.
(ii) A process of melting singly each of the two polymers and mixing the two in a molten state.
(iii) A process of melt mixing the two polymers by an ordinary extruder to make them chips and using the same.

The period during which a polyether-polyamide block copolymer is mixed with polyamide or polyester in a molten state is preferably so short as hardly causing any chemical reaction therebetween, for instance, amide exchange reaction and ester amide exchange reaction. When the period is made long, an amide exchange reaction or an ester amide exchange reaction proceeds sufficiently with a result that there is substantially hardly any difference from the case of using a polyether-polyamide block copolymer, the content of whose polyether segment is low. In this case, therefore, no substantial effect of mixing small amount of polyether-polyamide block copolymer with large amount of melt shapeable synthetic polymer can be obtained.

As to the adding method of such an organic compound, mixing with chips at the time of spinning is most simple, however, it may be added to each component or a specific component at the time of polymerization and this invention is not limited by the adding method.

The so obtained composition may be melt spun under ordinary spinning conditions and drawn under ordinary conditions and said composition may be used as one component of composite filaments.

The synthetic resin composition of this invention exhibits an excellent antistatic property which results from the synergistic effect attained by the copresence of the polyether-polyamide block copolymer and the ionic group of the organic compound, either of which exhibits independently an antistatic effect. This synergistic effect is much higher than the sum of the respective effects of said polyether-polyamide block copolymer and ionic group, which is clearly demonstrated in examples which will be given hereinbelow. Accordingly, as compared with a synthetic resin composition free of the ionic group, whose antistatic property results from the polyether-polyamide block copolymer alone, the composition of the present invention can exhibit a much higher antistatic effect with a small content of the polyether component. Therefore, the composition of the present invention can give articles or products excellent in antistatic property without any lowering of fibrous properties or mechanical properties.

The composition of this invention can be used not only for the preparation of fibers, bristles and films composed only of the composition, but also as one composite component of sheath-core or bimetal type composite filaments.

Now the present invention will be explained with reference to examples. The measuring methods adopted in examples are described below.

(1) Frictionally charged voltage

Using a rotary static tester, when knitted goods prepared from fibers to be tested are rubbed by a polyethylene terephthalate film, static voltage charged with the knitted goods is measured at 20° C. and 65% RH.

(2) Specific resistance

The fibers are bundled and electric resistances at the both ends are measured at 20° C. and 65% RH and specific resistances are calculated.

(3) Methods of measuring solution viscosity (A) Relative viscosity of a m-cresol solution:

Relative viscosity is measured at 25.0° C. with reference to the solution wherein 1 g. of the polymer is dissolved in 100 cc. of m-cresol.

(B) Relative viscosity of a sulfuric acid solution:

Relative viscosity is measured at 25.0° C. with reference to the solution wherein 1 g. of the polymer is dissolved in 100 cc. of 98% concentrated sulfuric acid.

EXAMPLE 1

450 g. of polyethylene glycol having a molecular weight of 4500 and 42.4 g. of acrylonitrile were reacted in the presence of a sodium hydroxide as catalyst. Then, the resulting cyanoethylated polyethylene glycol was subjected to the hydrogenation in the presence of a cobalt catalyst (U-Co-A) at 75–80° C. to obtain 460 g. of polyethylene oxide diamine in which 98% of both terminal groups were amino groups. Then, adipic acid was added to the polyethylene oxide diamine to form a salt thereof. Thereafter, 45 g. of the so formed salt was blended with 55 g. of ε-caprolactam, and the mixture was polymerized by heating to obtain 100 g. of polyethylene-polyamide block copolymer.

The polymerization was carried out by heating at 240° C. for 12 hours in a nitrogen gas under the atmospheric pressure. In this case the polymerization yield (the content of the hot water-insoluble portion) was 90% by weight. After the produced polymer was extracted with hot water by a usual manner to remove the unreached parts, the polymer was dried under a reduced pressure. When the block copolymer was subjected to the elementary analysis after the hot water extraction, it was found that in the copolymer the content of the polyethylene glycol component was equal to the content of the component in the starting composition.

The content of the polyether component of the obtained polyether-polyamide block copolymer was 45% by weight. Relative viscosity of a m-cresol solution of this polymer was 2.42.

On the other hand, poly-ε-capramide, relative viscosity of a 98% sulfuric acid solution thereof being 2.40, was prepared by a conventional manner. These two kinds of polymers were mixed in the form of chips at a weight ratio of the polyether-polyamide block copolymer to poly-ε-capramide of 1:24, the mixture was melt spun according to the conventional process to form an undrawn filament, and then the undrawn filaments were drawn 3.6× to prepare 70 denier/24-filament multifilaments.

The average content of the polyether component in the obtained fiber was about 1.8% by weight.

In conducting the above melt spinning, the following additives were added to the mixture at various ratios and the effects thereof were compared. As shown in the Table 1, by adding a very small amount of an organic electrolyte, the antistatic effect was improved remarkably.

(A) $C_{17}H_{35}COONa$ (B) 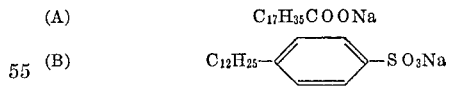

TABLE 1

| Kind | Additive Amount | | Antistatic effect | | Mechanical properties | | |
|------|------|------|------|------|------|------|------|
| | Wt. percent | Mol/g. | Frictionally charged voltage (v.) | Specific resistance (Ω·cm.) | Tenacity (g./d.) | Elongation (percent) | Initial modulus (g./d.) |
| None | 0 | 0 | 610 | $2.0 \times 10^9$ | 4.8 | 39.5 | 27.8 |
| A | 0.03 | $1.0 \times 10^{-6}$ | 600 | $1.2 \times 10^9$ | 4.9 | 38.5 | 26.7 |
| | 0.06 | $2.0 \times 10^{-6}$ | 510 | $4.2 \times 10^7$ | 4.7 | 40.0 | 28.1 |
| | 0.61 | $2.0 \times 10^{-5}$ | 250 | $1.8 \times 10^7$ | 4.8 | 39.0 | 27.5 |
| | 3.05 | $1.0 \times 10^{-4}$ | 190 | $1.1 \times 10^7$ | 4.4 | 38.5 | 24.2 |
| | 4.57 | $1.5 \times 10^{-4}$ | 180 | $1.1 \times 10^7$ | 3.8 | 39.0 | 20.1 |
| B | 0.035 | $1.0 \times 10^{-6}$ | 570 | $9.8 \times 10^7$ | 4.7 | 39.0 | 28.1 |
| | 0.070 | $2.0 \times 10^{-6}$ | 480 | $2.3 \times 10^7$ | 4.8 | 38.5 | 27.2 |
| | 0.70 | $2.0 \times 10^{-5}$ | 140 | $9.5 \times 10^6$ | 4.7 | 38.5 | 27.8 |
| | 3.50 | $1.0 \times 10^{-4}$ | 110 | $8.3 \times 10^6$ | 4.3 | 38.0 | 23.5 |
| | 5.25 | $1.5 \times 10^{-4}$ | 120 | $8.7 \times 10^6$ | 3.5 | 38.5 | 19.5 |

As will be apparent from Table 1, when the amount of an ionic functional group was less than $2.0 \times 10^{-6}$ mol/g., there was hardly any substantial effect, and when the amount became not less than $2.0 \times 10^{-6}$ mol/g., an effect appeared from the first time. When the amount became more than $1.0 \times 10^{-4}$ mol/g., yarn-spinnability became poor and other fiber characteristics (tenacity and initial modulus) were adversely affected.

EXAMPLE 2

Polyamide shown by a molecular formula, $$H \text{+} NH(CH_2)_5 CO \text{+}_n NH(CH_2)_6 NH_2$$

(average value of $n$ being 26), prepared by adding hexamethylene diamine to ε-caprolactam and polymerizing the mixture was mixed in the molten state with a compound having the following molecular formula

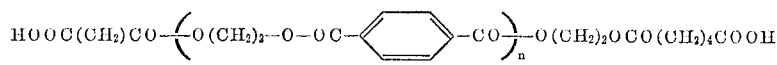

(average value of $n$ being 17.5), prepared by reacting polyethylene terephthalate with an acid chloride of adipic acid, thereafter treating the reaction mixture with water. so that the carboxyl terminal group and the amino terminal group might become equimolar, and the mixture was polymerized in solid phase at 180° C. under a reduced pressure of 3 mm. Hg for 8 hours to obtain a polyester polyamide block copolymer. On the other hand, according to the similar process as in Example 1, polyethylene glycol having a number average molecular weight of about 2000 was cyanoethylated and hydrogenated to synthesize diamine of polyethylene oxide of a structure in which 98% of the terminal groups were amino groups, and an equimolar amount of adipic acid was reacted therewith to form a diamine salt, with which salt anhydrous ε-caprolactam was mixed so that content of a polyethylene oxide portion might become 24% by weight, the mixture being heated at 240° C. in a nitrogen atmosphere for 20 hours to obtain a polyether-polyamide block copolymer. The so obtained polyether-polyamide block copolymer chips, the polyester-polyamide block copolymer chips, polyhexamethylene adipamide chips and polyethylene terephthalate chips were mixed at a weight ratio of 1:1:1:1 by a blender. To this mixture 0.5% by weight of the following organic electrolytes were added, and the resultant mixtures were melt spun at a spinning temperature of 290° C. and a winding speed of 600 m./min., further, the filaments were drawn 3.9× to obtain drawn filaments. The average content of the polyether component in the obtained filament was about 6% by weight. Characteristics of the so obtained drawn filaments were shown in Table 2.

(A) Potassium stearate
(B) Sodium salt of a polycapramide oligomer $(NaOOC(CH_2)_4 CO[NH(CH_2)_5 CO]_n ONa, \; \bar{n}=11)$ (C) 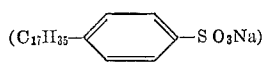

(D) 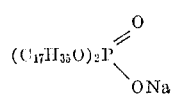

TABLE 2

| Organic electrolyte | Adding ratio Wt. percent | Adding ratio Mole/g. | Frictionally charged voltage (v.) | Specific resistance (Ω·cm.) |
|---|---|---|---|---|
| None | 0 | 0 | 850 | $8.1 \times 10^8$ |
| A | 0.5 | $1.6 \times 10^{-5}$ | 95 | $9.2 \times 10^6$ |
| B | 0.5 | $0.35 \times 10^{-5}$ | 100 | $9.4 \times 10^6$ |
| C | 0.5 | $1.2 \times 10^{-5}$ | 120 | $9.7 \times 10^6$ |
| D | 0.5 | $0.84 \times 10^{-5}$ | 135 | $9.9 \times 10^6$ |

EXAMPLE 3

A polyether-polyamide block copolymer obtained by the same process as in Example 2 was mixed with polyethylene terephthalate in the form of chips at weight ratios of 1:5, 1:3 and 1:2, and the mixtures, without addition of organic electrolyte, were melt spun and drawn to obtain filaments having fiber characteristics as shown in Table 3. Contents of polyether portions in the filaments were 4, 6 and 8% by weight, respectively.

On the other hand, after addition of 0.5% by weight of sodium stearate, potassium stearate and calcium stearate to the above three mixtures, respectively, the resulting resin compositions were melt spun as mentioned above.

By way of comparison, fiber characteristics of what was obtained by melt spinning polyethylene terephthalate alone and what was obtained by melt spinning polyethylene terephthalate blended with the aforementioned metal salts of stearic acid only were also measured. The results are shown in Table 3.

By adding metal salts of stearic acid to the polyether-polyamide block copolymer, the antistatic effect was improved remarkably and the synergistic effect of the existence of both the polyether component and the metal salt was very remarkable.

TABLE 3

| Content of PEG component (wt. percent) | Kind | Adding ratio Wt. percent | Adding ratio Mole/g. | Frictionally charged voltage (v.) |
|---|---|---|---|---|
| 0 | None | 0 | 0 | 3,850 |
|  | Na salt | 0.5 | $1.6 \times 10^{-5}$ | 3,250 |
|  | K salt | 0.5 | $1.5 \times 10^{-5}$ | 3,030 |
|  | Ca salt | 0.5 | $0.83 \times 10^{-5}$ | 3,480 |
| 4 | None | 0 | 0 | 1,450 |
|  | Na salt | 0.5 | $1.6 \times 10^{-5}$ | 650 |
| 6 | None | 0 | 0 | 1,090 |
|  | Na salt | 0.5 | $1.6 \times 10^{-5}$ | 185 |
|  | K salt | 0.5 | $1.5 \times 10^{-5}$ | 165 |
|  | Ca salt | 0.5 | $0.83 \times 10^{-5}$ | 420 |
| 8 | None | 0 | 0 | 710 |
|  | Na salt | 0.5 | $1.6 \times 10^{-5}$ | 170 |

EXAMPLE 4

According to the similar process as in Example 1, by heat polymerizing ε-caprolactam in the presence of a salt consisting of diamine of polyethylene oxide having a number average molecular weight of about 3050 and adipic acid, a polyether-polyamide block copolymer, whose content of a polyethylene oxide component being 8% by weight, was synthesized. Said block copolymer per se alone was melt spun, and in that time, 0.3% by weight of the various additives shown in Table 4 was added at a concentration of $2\times10^{-5}$ mol/g. and the effects were compared.

TABLE 4

| Additive | Frictionally charged voltage (v.) |
|---|---|
| $C_{17}H_{35}\!-\!\!\langle\!\!\!\bigcirc\!\!\!\rangle\!-\!SO_3Na$ | 160 |
| $C_9H_{19}\!-\!\!\langle\!\!\!\bigcirc\!\!\!\rangle\!-\!O(CH_2CH_2O)_4SO_3\cdot\tfrac{1}{2}Mn$ | 430 |
| $\begin{array}{c}C_{17}H_{35}O\\\phantom{C_{17}H_{35}O}\diagdown\\\phantom{C_{17}H_{35}O}P\!=\!O\\\phantom{C_{17}H_{35}O}\diagup\phantom{O}\diagdown\\C_{17}H_{35}O\phantom{XXXX}ONa\end{array}$ | 210 |
| $\begin{array}{c}C_{16}H_{33}\\\phantom{XX}\diagdown\\\phantom{XXX}N^+(CH_3)_2Cl^-\\\phantom{XX}\diagup\\C_{18}H_{33}\end{array}$ | 320 |
| None | 1,050 |

EXAMPLE 5

From one hopper of a composite yarn spinning machine, a polyether-polyamide block copolymer was fed and from the other hopper thereof a polyester-polyamide block copolymer was fed. The preparation of these two block copolymers will be described below. Melting the polyether-polyamide block copolymer at 250° C. and the polyester-polyamide block copolymer at 280° C., using a composite spinneret, side-by-side type composite filaments at a composite ratio of 1:1 were melt spun.

The addition of the organic electrolyte was effected in the following three ways. Namely, in the first instance, potassium stearate was added to the polyether-polyamide block copolymer at a concentration of $4\times10^{-5}$ mol/g., in the second instance, potassium stearate was added to the polyester-polyamide block copolymer at a concentration of $4\times10^{-5}$ mol/g. and in the third instance, potassium stearate was added to both the polyether-polyamide block copolymer and the polyester-polyamide block copolymer, at a concentration of $2\times10^{-5}$ mol/g. respectively. Side-by-side type composite filaments were prepared from these compositions in a manner as described above.

The so obtained undrawn filaments were drawn $3.8\times$ using a hot drawing pin at 80° C. and a plate heated at 150° C. to obtain composite drawn filaments.

Antistatic property, C.R. (compliance ratio), etc. were measured of the drawn filaments and the results were shown in Table 5.

existence of both the polyether component and the metal salt was very remarkable.

The polyether-polyamide block copolymer used herein was synthesized as follows.

From diamine of polyethylene oxide shown by a molecular formula, $H_2N\cdot H_2C(CH_2CH_2O)_nCH_2CH_2CH_2NH_2$ (number average molecular weight: about 2000) and adipic acid, a diamine salt was formed.

This diamine salt was mixed with ε-caprolactam so that a polyethylene oxide portion might become 10% by weight and the mixture was heat polymerized at 250° C. in a nitrogen atmosphere for 20 hours.

A process for synthesizing the polyester-polyamide block copolymer was as follows.

Polyamide having a molecular formula, $$H(\!-\!NH(CH_2)_5CH\!-\!)_n NH(CH_2)_6NH_2$$

(average value of $n$ being 35) obtained by adding hexamethylene diamine to ε-caprolactam and polymerizing the mixture, and what had a molecular formula

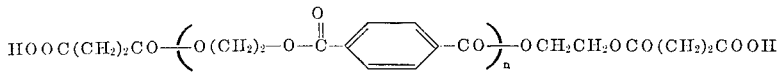

(average value of $n$ being 58) obtained by dissolving polyethylene terephthalate in α-naphthalene and reacting the resultant solution with succinic anhydride to make the end a carboxyl group were so mixed in molten state that molar ratio of terminal amino group to terminal carboxyl group might become precisely 1:1, and the mixture was polymerized in solid phase at 180° C. under a reduced pressure of 3 mm. Hg for 6 hours to obtain a polyester-polyamide block copolymer.

Each of these copolymers themselves was well spinnable.

C.R. in this example was measured by the following method.

C.R.: It was measured of filaments and calculated from the following equation.

$$C.R.=\frac{10/L_{10}-5/L_5}{5}$$

L$x$ was a value expressed by g./d. of a stress at the time of elongation by $x\%$.

EXAMPLE 6

Using as one component of composite filaments polycapramide and as the other component a polyethylene oxide-polycapramide block copolymer obtained by the similar process to that in Example 5 which had been added with various additives, composite undrawn filaments disposed in a core-sheath type were prepared by the process similar to that in Example 5. In this case, to the

TABLE 5

| Potassium stearate | Frictionally charged voltage (v.) | C.R. (g./d.) | Tenacity (g./d.) |
|---|---|---|---|
| 0 | 895 | 0.31 | 3.9 |
| Added to the polyether-polyamide block copolymer | 93 | 0.31 | 3.8 |
| Added to the polyesterpolyamide block copolymer | 488 | 0.31 | 4.0 |
| Added to the two components | 126 | 0.32 | 3.9 |

By addition of potassium stearate, the antistatic property greatly was improved and the synergistic effect of the core nylon 6 was made to come and to the sheath the polyethylene glycol-polycapramide copolymer was made to come and both concentric and eccentric undrawn filaments were prepared. Disposition of the eccentric center was so made as not to expose the core. By hot drawing the undrawn filaments, composite drawn filaments were obtained. The so obtained composite drawn filaments had excellent antistatic effects. The properties of these drawn filaments were shown in Table 6.

By way of comparison, a case of composite filaments consisting of random copolymeric polyamide of ε-caprolactam and hexamethylene diammonium adipate (ratio of nylon 6 to nylon 66 being 85:15), instead of the polyethylene glycol-polycapramide block copolymer, and nylon 6 was concurrently described.

properties were excellent. Characteristics of the drawn filaments were shown in Table 7.

TABLE 7

| Additive | Frictionally charged voltage (v.) | Tenacity (g./d.) | Elongation (percent) | No. of convolution (No./25 mm.) |
|---|---|---|---|---|
| None (concentric) | 420 | 5.1 | 33.2 | 0 |
| A (concentric) | 54 | 5.2 | 31.5 | 0 |
| A (eccentric) | 58 | 5.2 | 32.1 | 15 |
| B (concentric) | 50 | 5.1 | 31.5 | 0 |
| C (concentric) | 69 | 5.3 | 28.3 | 0 |
| D (concentric) | 75 | 5.0 | 32.1 | 0 |
| E (concentric) | 73 | 5.1 | 31.5 | 0 |

TABLE 6
Properties of core-sheath type drawn filaments

| Polyethylene oxide in a polyethylene oxide-polycapramide block copolymer | | Ratio of a metal salt added ($10^{-5}$ mole/g.) | Composite | | Tenacity (g./d.) | Elongation (percent) | Frictionally charged voltage (v.) | Specific resistance (Ω·cm.) |
|---|---|---|---|---|---|---|---|---|
| Number average molecular weight | Content of polyethylene oxide (wt. percent) | | Ratio | Shape | | | | |
| 1,500 | 15.0 | Sodium stearate (4) | 50:50 | Concentric | 4.8 | 39.8 | 10 | $8.3 \times 10^1$ |
| 1,500 | 15.0 | Sodium salt of nylon 6 oligomer (4) | 50:50 | do | 4.8 | 42.7 | 35 | $2.1 \times 10^5$ |
| 1,500 | 15.0 | Sodium p-oxyphenylsulfonate (4) | 50:50 | Eccentric | 4.7 | 41.8 | 35 | $2.0 \times 10^5$ |
| 1,500 | 15.0 | Manganese stearate (4) | 50:50 | Concentric | 4.5 | 43.0 | 25 | $1.1 \times 10^{10}$ |
| 6,000 | 15.0 | Phosphoric acid derivative (a)(4) | 50:50 | do | 4.3 | 44.4 | 30 | $1.6 \times 10^{85}$ |
| 6,000 | 23.0 | Ammonium compound (b)(4) | 50:50 | Eccentric | 4.2 | 43.9 | 25 | $1.2 \times 10^{10}$ |
| Control sample (c) Nylon 6/66 (85/15) | | 0 | 50:50 | Concentric | 5.6 | 42.0 | 2,940 | $4.3 \times 1^5$ |

(a)
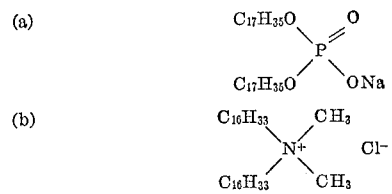

(b)

$$\begin{array}{c} C_{16}H_{33} \\ \diagdown \\ C_{16}H_{33} \end{array} \!\!\! N^{+} \!\!\! \begin{array}{c} CH_3 \\ \diagup \\ CH_3 \end{array} \quad Cl^-$$

(c) Caprolactam/hexamethylene diammonium adipate 85/15 (weight ratio)

EXAMPLE 7

From one hopper of a composite spinning machine, feeding a polyether-polyamide block copolymer similar to that used in Example 5 and feeding from the other hopper polyethylene terephthalate, using a core-sheath type composite spinneret, composite undrawn filaments wherein polyethylene terephthalate was disposed at the core and the polyether-polyamide block copolymer was disposed at the sheath concentrically and eccentrically were prepared. The composite ratio was 1:1. In this case, to the polyether-polyamide block copolymer the following organic electrolytes in amount of $2 \times 10^{-5}$ mol/g. were added.

(A) Sodium stearate (B) Potassium stearate (C) $C_{17}H_{35}$—⟨ ⟩—$SO_3Na$ (D) $(C_{17}H_{35}O)_2P\diagdown\!\!\!\!\begin{array}{c}O\\ONa\end{array}$ (E) $NaOOC(CH_2)_4CO[NH(CH_2)_5CO]_nONa$ ($\overline{n}=9$)

By drawing 4.2× this undrawn filaments using a drawing pin heated at 110° C. and a plate heated at 130° C., undrawn filaments having apparent crimpability were obtained. Because this composite filaments were covered with the polyether-polyamide block copolymer, their antistatic

What we claim is:

1. An antistatic synthetic resin composition comprising a melt-shapeable synthetic resin selected from polyamides, polyester, and polyester-polyamide block copolymers,
a polyalkylene oxide-polyamide block copolymer wherein the polyamide segments of said polyalkylene oxide-polyamide copolymer have repeating carbonamide groups as an integral part of the polymeric chain, said polyalkylene oxide-polyamide copolymer containing polyalkylene oxide segments in an amount of 15–85 percent by weight thereof, said polyalkylene oxide segments comprising 0.1–20 percent by weight based upon the total weight of said synthetic resin composition, and
an organic compound having at least one ionic group selected from a sulfonic acid group, phosphoric acid group and metal salts thereof, said ionic group being present in an amount from about $2.0 \times 10^{-6}$ to $1.0 \times 10^{-4}$ mol/g. based upon the total weight of said synthetic resin composition.

2. The antistatic synthetic resin composition of claim 1 wherein said organic compound containing said ionic group is selected from the group consisting of organic acids, metal salts thereof and organic ammonium salts.

3. Antistatic shaped articles prepared by melt-shaping the antistatic synthetic resin composition of claim 1.

References Cited
UNITED STATES PATENTS 3,190,763  6/1965  Schleede _____ 106—186
3,384,681  5/1968  Kobayashi _____ 260—857

PAUL LIEBERMAN, Primary Examiner

U.S. Cl. X.R.

260—18 N, 22 CQ, 23 H, 23 XA, 23 R, 78 R, 78 S, 857 L; 264—171; 161—175

UNITED STATES PATENT OFFICE
CERTIFICATE OF CORRECTION

Patent No. 3,632,666　　　　　　　Dated January 4, 1972

Inventor(s) OKAZAKI ET AL

It is certified that error appears in the above-identified patent and that said Letters Patent are hereby corrected as shown below:

Page 4, column 7, lines 17-23, delete the formula and insert the following formula--

Page 5, column 10, lines 15-18, delete the formula

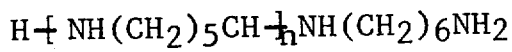

and insert the following formula --

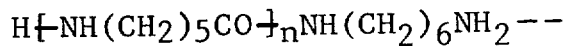

Page 6, column 12, first entry under the heading Specific resistance ($\Omega \cdot$cm.), delete "$10^1$" and insert -- $10^5$ -- .

Page 6, column 12, fourth entry under the heading Specific resistance ($\Omega \cdot$cm.), delete "100" and insert -- $10^6$ -- .

Page 6, column 12, fifth entry under the heading Specific resistance ($\Omega \cdot$cm.), delete "$0^{65}$" and insert -- $10^6$ -- .

- to be continued -

UNITED STATES PATENT OFFICE
CERTIFICATE OF CORRECTION

Patent No. 3,632,666　　　　Dated January 4, 1972

Inventor(s) OKAZAKI ET AL

It is certified that error appears in the above-identified patent and that said Letters Patent are hereby corrected as shown below:

Page 6, column 12, sixth entry under the heading Specific resistance ($\Omega$·cm.), delete "$10^{10}$" and insert -- $10^6$ -- .

Page 6, column 12, seventh entry under the heading Specific resistance ($\Omega$·cm.), delete "$1\ ^5$" and insert -- $10^{10}$ -- .

Signed and sealed this 4th day of July 1972.

(SEAL)
Attest:

EDWARD M. FLETCHER, JR.　　　　ROBERT GOTTSCHALK
Attesting Officer　　　　　　　　Commissioner of Patents